(12) United States Patent
Muthukrishnan et al.

(10) Patent No.: US 12,081,554 B2
(45) Date of Patent: *Sep. 3, 2024

(54) EXTENDED DOMAIN PLATFORM FOR NONMEMBER USER ACCOUNT MANAGEMENT

(71) Applicant: Microsoft Technology Licensing, LLC, Redmond, WA (US)

(72) Inventors: Arvind Muthukrishnan, Redmond, WA (US); Mansoor Jafry, Bellevue, WA (US); Ramakrishna Juluri, Seattle, WA (US); Ariel Gordon, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/333,612

(22) Filed: Jun. 13, 2023

(65) Prior Publication Data

US 2024/0015160 A1    Jan. 11, 2024

Related U.S. Application Data

(63) Continuation of application No. 17/743,119, filed on May 12, 2022, now Pat. No. 11,843,607, which is a (Continued)

(51) Int. Cl.
*H04L 61/58* (2022.01)
*H04L 9/40* (2022.01)
*H04L 61/3015* (2022.01)

(52) U.S. Cl.
CPC ........ *H04L 63/102* (2013.01); *H04L 61/3025* (2013.01); *H04L 63/10* (2013.01); *H04L 61/58* (2022.05); *H04L 63/101* (2013.01)

(58) Field of Classification Search
CPC ... H04L 63/102; H04L 61/3025; H04L 61/10; H04L 61/101
(Continued)

(56) References Cited

U.S. PATENT DOCUMENTS 9,178,876 B1 * 11/2015 Johansson ............... G06F 21/00
9,466,051 B1 * 10/2016 Roth ................... G06F 21/6218
(Continued)

FOREIGN PATENT DOCUMENTS

CA    3098610 A1 * 11/2019 ........... G06F 21/606

OTHER PUBLICATIONS

"Office Action Issued in Indian Patent Application No. 202247004232", Mailed Date: Oct. 10, 2023, 6 Pages.
(Continued)

*Primary Examiner* — Khanh Q Dinh
(74) *Attorney, Agent, or Firm* — NovoTechIP International PLLC

(57) ABSTRACT

A device including a processor and a memory, in which the memory includes executable instructions for detecting that a first user has invited a second user to a communication session, wherein the first user is associated with a first user account registered to a first domain platform and the second user is not associated with any of user accounts registered to the first domain platform, the first domain platform defining a first user privilege granted to the user accounts registered to the first domain platform; causing a second user account associated with the second user to be created and registered to a second domain platform, the second domain platform being different from the first domain platform and defining a second user privilege granted to user accounts registered to the second domain platform; and granting the second user account the second user privilege.

20 Claims, 21 Drawing Sheets

Related U.S. Application Data continuation of application No. 16/578,223, filed on Sep. 20, 2019, now Pat. No. 11,343,257.

(60) Provisional application No. 62/867,858, filed on Jun. 27, 2019.

(58) Field of Classification Search
USPC ............... 709/220, 224, 226, 228, 225, 227
See application file for complete search history.

(56) References Cited

U.S. PATENT DOCUMENTS

| | | | | |
|---|---|---|---|---|
| 10,467,426 | B1* | 11/2019 | Esposito | G06F 16/24564 |
| 10,523,682 | B1* | 12/2019 | Badawy | H04L 63/1408 |
| 10,554,665 | B1* | 2/2020 | Badawy | H04L 63/20 |
| 10,637,339 | B2* | 4/2020 | Liu | H02K 1/34 |
| 11,343,257 | B2* | 5/2022 | Muthukrishnan | H04L 63/10 |
| 11,843,607 | B2* | 12/2023 | Muthukrishnan | H04L 63/105 |
| 2002/0188865 | A1* | 12/2002 | Joseph | H04L 9/0894 |
| | | | | 713/153 |
| 2012/0066755 | A1* | 3/2012 | Peddada | H04L 63/102 |
| | | | | 726/8 |
| 2015/0200945 | A1* | 7/2015 | Edson | G06F 16/93 |
| | | | | 726/28 |
| 2017/0300627 | A1* | 10/2017 | Giordano | G06F 21/6245 |
| 2017/0346865 | A1* | 11/2017 | Hartman | H04N 21/25875 |
| 2017/0359295 | A1* | 12/2017 | Verma | G06Q 10/00 |
| 2018/0322204 | A1* | 11/2018 | Dintenfass | G16H 40/20 |
| 2018/0324186 | A1* | 11/2018 | Dintenfass | G06F 21/31 |
| 2018/0343261 | A1* | 11/2018 | Lopez-Uricoechea | |
| | | | | H04L 63/126 |
| 2020/0218795 | A1* | 7/2020 | Antar | H04L 9/0643 |
| 2020/0320458 | A1* | 10/2020 | Loreto | H04L 63/102 |
| 2020/0388778 | A1* | 12/2020 | Bulovic | H10K 30/10 |

OTHER PUBLICATIONS

"Notice of Allowance Issued in European Patent Application No. 20727125.5", Mailed Date: Sep. 14, 2023, 2 Pages.

"Notice of Allowance Issued in European Patent Application No. 20727125.5", Mailed Date: May 19, 2023, 8 Pages.

* cited by examiner

Peter (Nonmember)

Will (Member)

Wasif (Member)

Peter (Nonmember)

Will (Member)

Wasif (Member)

Peter (Nonmember)

Will (Member)

Wasif (Member)

Peter (Nonmember)

Will (Member)

Wasif (Member)

Peter (Nonmember)

Will (Member)

Wasif (Member)

Peter (Nonmember)

Will (Member)

Wasif (Member)

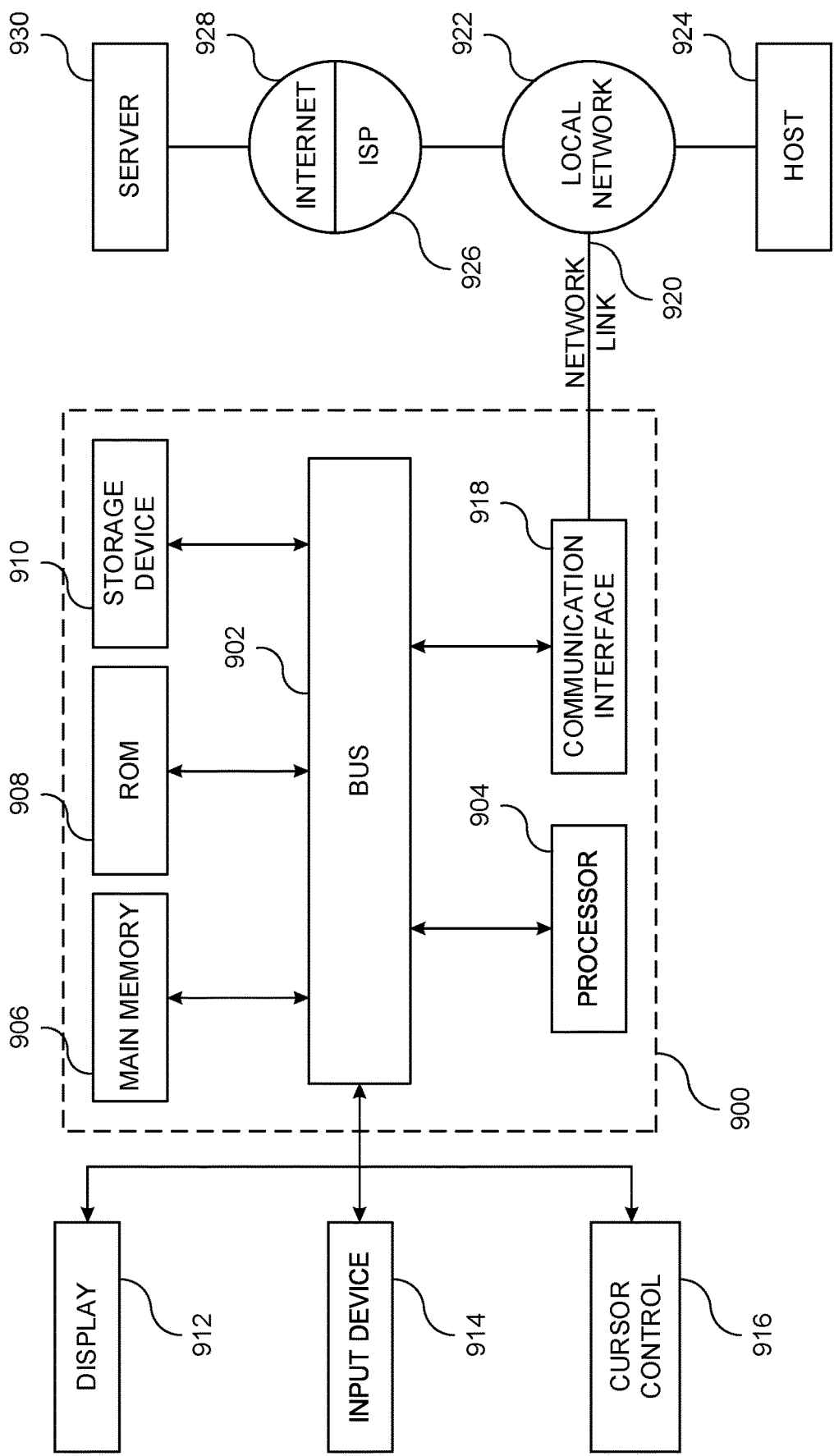

EXTENDED DOMAIN PLATFORM FOR NONMEMBER USER ACCOUNT MANAGEMENT

CROSS REFERENCE TO RELATED APPLICATIONS

This application is a Continuation of U.S. patent application Ser. No. 17/743,119 filed on May 12, 2022, which is a Continuation of U.S. patent application Ser. No. 16/578,223 filed on Sep. 20, 2019, which claims priority under 35 U.S.C. § 1.119(e) and the benefit thereof from U.S. Provisional Application No. 62/867,858, filed on Jun. 27, 2019, which are incorporated hereto in their entirety.

BACKGROUND

More and more people use messaging applications (e.g., Facebook™ Messenger™ Discord™, IMessage™, Kakao Talk™, Line™, Skype™, Snapchat™, Telegram™, Viber™ WeChat™, WhatsApp™, Slack™, Microsoft™ Teams™, etc.) daily for personal and business purposes. While most of the messaging applications are developed and marketed for individual consumers, some messaging applications provide workplace solutions, such as group chat, file sharing, group video calling, etc., to enhance collaboration within an organization. Those workplace messaging applications, however, come with various strict or severe boundary restrictions between those who are within the organization boundary and those who are outside the organization boundary such that activities on the messaging applications are not disclosed to those who are not authorized members of the organization. Due to such boundary restrictions, members tend to favor those messaging applications that have less or no boundary restrictions such that they can communicate and collaborate more easily with those who are not members of the organization. In such cases, the organization may not be aware that its members are using unverified messaging applications to collaborate with those who are outside the organization boundary. Even if such activities are known to the organization, the chatrooms are operated by a third party messaging application solution provider, and thus the organization has virtually no control over the messaging activities and cannot track or record the activities or take any measurements for confidentiality and security. As such, there still remain significant areas for new and improved implementations for enhancing communications among parties on both sides of the organization borderline in a more controlled and manageable manner.

SUMMARY

In an implementation, a device includes a processor and a memory in communication with the processor. The memory includes executable instructions that, when executed by the processor, cause the processor to control the device to perform functions of detecting that a first user has invited a second user to a communication session, wherein the first user is associated with a first user account registered to a first domain platform and the second user is not associated with any of user accounts registered to the first domain platform, the first domain platform defining a first user privilege granted to the user accounts registered to the first domain platform; based on the detection that the first user has invited the second user to the communication session, causing a second user account associated with the second user to be created and registered to a second domain platform, the second domain platform being different from the first domain platform and defining a second user privilege granted to user accounts registered to the second domain platform; and granting the second user account the second user privilege.

In another implementation, a method of operating a device for providing a communication solution between a user registered to a domain platform and another user not registered to the same domain platform, includes detecting that a first user has invited a second user to a communication session, wherein the first user is associated with a first user account registered to a first domain platform and the second user is not associated with any of user accounts registered to the first domain platform, the first domain platform defining a first user privilege granted to the user accounts registered to the first domain platform; based on the detection that the first user has invited the second user to the communication session, causing a second user account associated with the second user to be created and registered to a second domain platform, the second domain platform being different from the first domain platform and defining a second user privilege granted to user accounts registered to the second domain platform; and granting the second user account the second user privilege.

In another implementation, a non-transitory computer readable medium contains instructions which, when executed by a processor, cause a computer to perform functions of detecting that a first user has invited a second user to a communication session, wherein the first user is associated with a first user account registered to a first domain platform and the second user is not associated with any of user accounts registered to the first domain platform, the first domain platform defining a first user privilege granted to the user accounts registered to the first domain platform; based on the detection that the first user has invited the second user to the communication session, causing a second user account associated with the second user to be created and registered to a second domain platform, the second domain platform being different from the first domain platform and defining a second user privilege granted to user accounts registered to the second domain platform; and granting the second user account the second user privilege.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 9 is a block diagram showing an example computer system upon which aspects of this disclosure may be implemented.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

This description is directed to providing a borderless communication and collaboration solution between those who are within a domain or identify platform (e.g., members) and those who are outside the domain or identity platform (e.g., nonmembers) such that members can communicate and collaborate with nonmembers in an easier, more convenient and less restrictive manner while an organization operating the domain can track and monitor activities between members and nonmembers. To achieve this, an extended domain platform is provided in addition to a main domain platform of the organization. When a member initiates a communication session with a nonmember, a nonmember user account may be created for the nonmember and the nonmember user account may be registered in the extended domain platform. Since the nonmember user account is not registered to the main domain platform, there is no need to modify the main domain platform to add nonmember information. The extended domain platform may define user privileges of the nonmember user account, including a privilege to access the communication session. Hence, the nonmember can immediately participate in the communication session without needing to create an account or singing up for a new communication service. Depending on the granted user privileges, the nonmember may search or initiate a communication session with members or nonmembers registered to the main or extended domain platforms. Since members and nonmembers can communicate with each other with very little or no restriction, this description provides a technical solution to the technical problem of existing solutions that impose strict or severe restrictions on a communication between members and nonmembers. Also, once a nonmember is registered to the extended domain platform, the organization can track and monitor all activities by the nonmember and apply rules and restrictions to ensure security and confidentiality. Whenever deemed necessary, an organization can remove a nonmember from all ongoing communication sessions or change or revoke the user privileges granted to the nonmember. As such, this description provides the technical solutions to the technical problems with the existing solutions that an organization cannot track, monitor and manage the communication and collaboration sessions between members and nonmembers.

Figure 1:
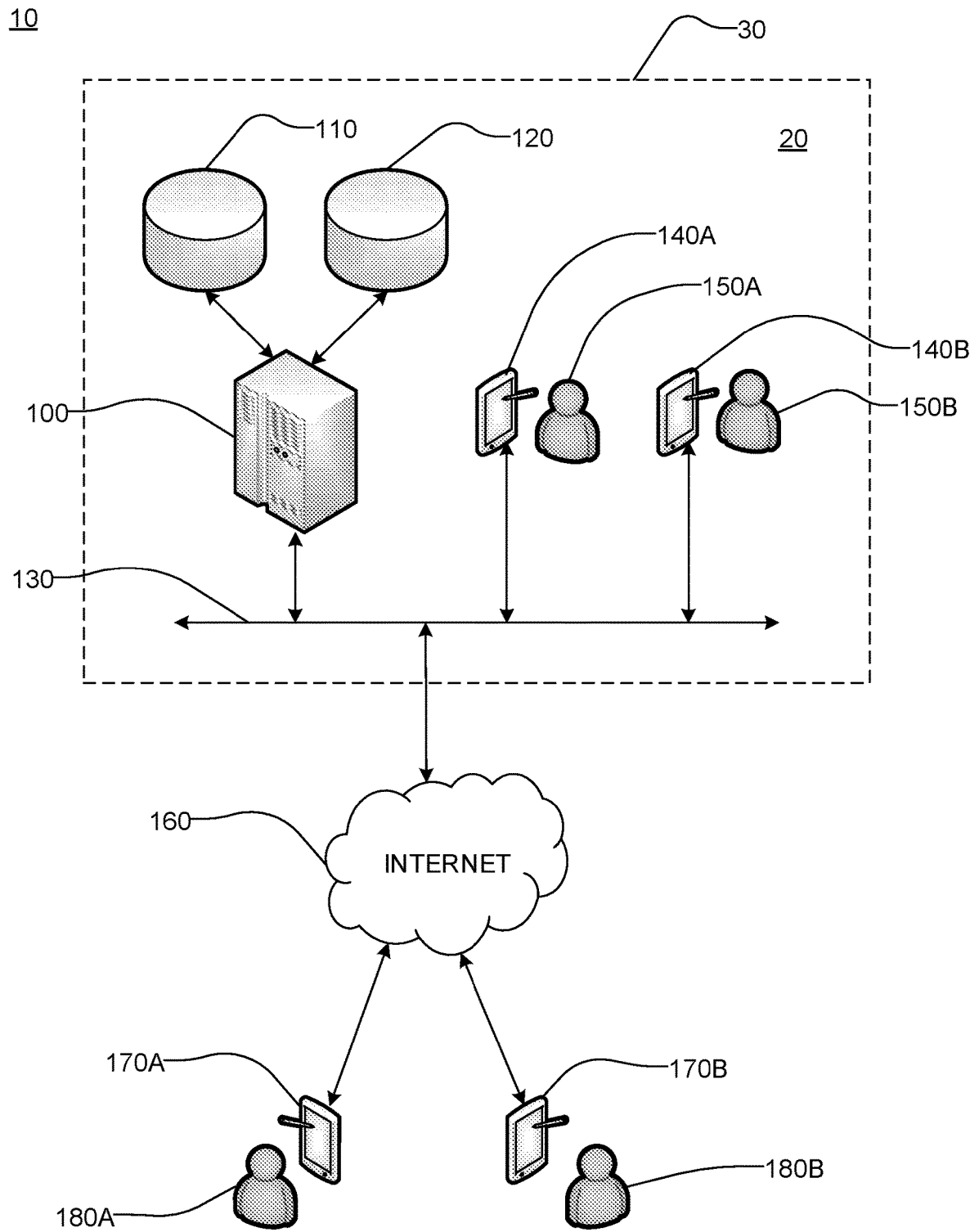
FIG. 1 illustrates an implementation of a system configured to provide a borderless communication and collaboration solution between members of an organization and nonmembers who are outside a boundary of the organization.

FIG. 1 illustrates an implementation of a system 10 configured to provide a borderless communication and collaboration solution between members of an organization 20 and nonmembers who are outside a boundary 30 of the organization 20. The boundary 30 may define a network domain of the organization 20. For example, the members may be registered users of the network domain, and the nonmembers may be users of another network domain. The organization 20 may operate a device 100, a main domain platform 110 and extended domain platform 120. The device 100 may be configured to provide a borderless communication and collaboration solution between the members and nonmembers. For example, the device 100 may be a messenger application server configured to host a communication session, such as, a group chatroom, audio conference, videoconference, etc. The device 100 may be connected to the main domain platform 110 and extended domain platform 120.

The main domain platform 110 may be a directory-based identity-related service platform for a domain network, such as Microsoft Active Directory, for authenticating and authorizing members 150A and 150B of the organization 20 (collectively "members 150" hereinafter) and member devices 140A and 140B (collectively "member devices 140" hereinafter) associated with the members 150. The main domain platform 110 may include two or more domain platforms. This may happen when two or more organizations, each having an established domain platform, are merged together or an organization operating a domain platform is acquired by another organization operating another domain platform.

The main domain platform 110 may manage user accounts associated with the members 150 of the organization 20 and store and manage member information (e.g., a name, email address, phone number, network alias, messenger ID, title, department, team, supervisor, etc.) of the members 150 associated with the member user accounts registered to the main domain platform 110. The main domain platform 110 may define and grant user privileges to the member user accounts of the members 150 registered to the main domain platform 110. The user privileges granted to the member user accounts may include a privilege to invite, to a communication session, a user that is not associated with any of the user accounts registered to the main domain platform 110 or extended domain platform 120, a privilege to add the second user to a domain directory managed by the main domain platform 110 or extended domain platform 120 such that the second user is searchable on the domain directory, a privilege to revoke a user privilege granted to the nonmember user account, a privilege to remove a nonmember user account from the extended domain platform 120, etc. The member user privileges may also specify access rights, security clearance levels, etc. of the member user accounts associated with the members 150. Based on the user privileges, the main domain platform 110 may enforce security policies to the member devices 140 and software installed in the member devices 140.

The extended domain platform 120 may be a directory-based identity-related service platform for authenticating and authorizing nonmembers 180A and 180B (collectively "nonmembers 180" hereinafter), who are not members of the organization 20, and nonmember devices 170A and 170B (collectively "nonmember devices 170" hereinafter) associated with the nonmembers 180. The extended domain platform 120 may create a nonmember user account associated with a nonmember when the nonmember has been invited by a member to a communication session. The extended domain platform 120 may store and manage the nonmember user accounts and nonmember information (e.g., a name, email address, phone number, network alias, messenger ID, title, department, team, supervisor, etc.) of the nonmembers 180 associated with the nonmember user accounts registered to the extended domain platform 120.

The extended domain platform 120 may define and grant user privileges to the nonmember user accounts. The user privileges granted to the nonmember user accounts may include a privilege to access a domain directory managed by the main domain platform 110 or extended domain platform 120, a privilege to start a new communication session, a privilege to invite, to a communication session, a user registered to the main domain platform 110 or extended domain platform 120, etc. The nonmember user privileges may also specify access rights, security clearance levels, etc. of the nonmember user accounts. Based on the nonmember user privileges, the extended domain platform 120 may enforce security policies to the nonmember devices 170 and software installed in the nonmember devices 170.

The nonmembers 180 associated with the nonmember user accounts registered to the extended domain directory 120 and the members 150 associated with the member user accounts registered to the main domain directory 110 may be mutually exclusive. Hence, the nonmember accounts and member accounts may be separately stored and managed by two different domain platforms. This may allow to keep the main domain platform 110 free of any nonmember information, making it easier to manage and maintain the member user accounts and information stored in the main domain platform 110. Hence, it is far less likely for activities (e.g., creating, editing or deleting a nonmember account) at the extended domain platform 120 to cause any negative impact on the integrity of the member user account and information stored in the main domain platform 110. Also, the extended domain platform 120 does not need to manage the member user accounts and it becomes simpler and easier to manage and maintain the nonmember user account and information.

The device 100 may be connected to the member devices 140 via a network 130, which may include an intranet of the organization 20. The member devices 140A and 140B may be associated with members 150A and 150B, respectively. The device 100 and member devices 140 may be connected to an internet 160 via the network 130. The nonmember devices 170 may also be connected to the internet 160. The nonmember devices 170A and 170B may be associated with nonmembers 180A and 180B, respectively.

In an implementation, the device 100 may be a messaging application server configured to host and manage a communication session (e.g., a chat session, audio call session, video call session, etc.) between the member devices 140 and between the member devices 140 and nonmember devices 170. The member and nonmember devices 140 and 170 may be any computing device with communication capabilities, such as, a mobile phone, tablet PC, desktop PC, laptop PC, etc. The member and nonmember devices 140 and 170 may operate a messaging application configured to operate in communication with the messaging application server 100.

Figure 2:
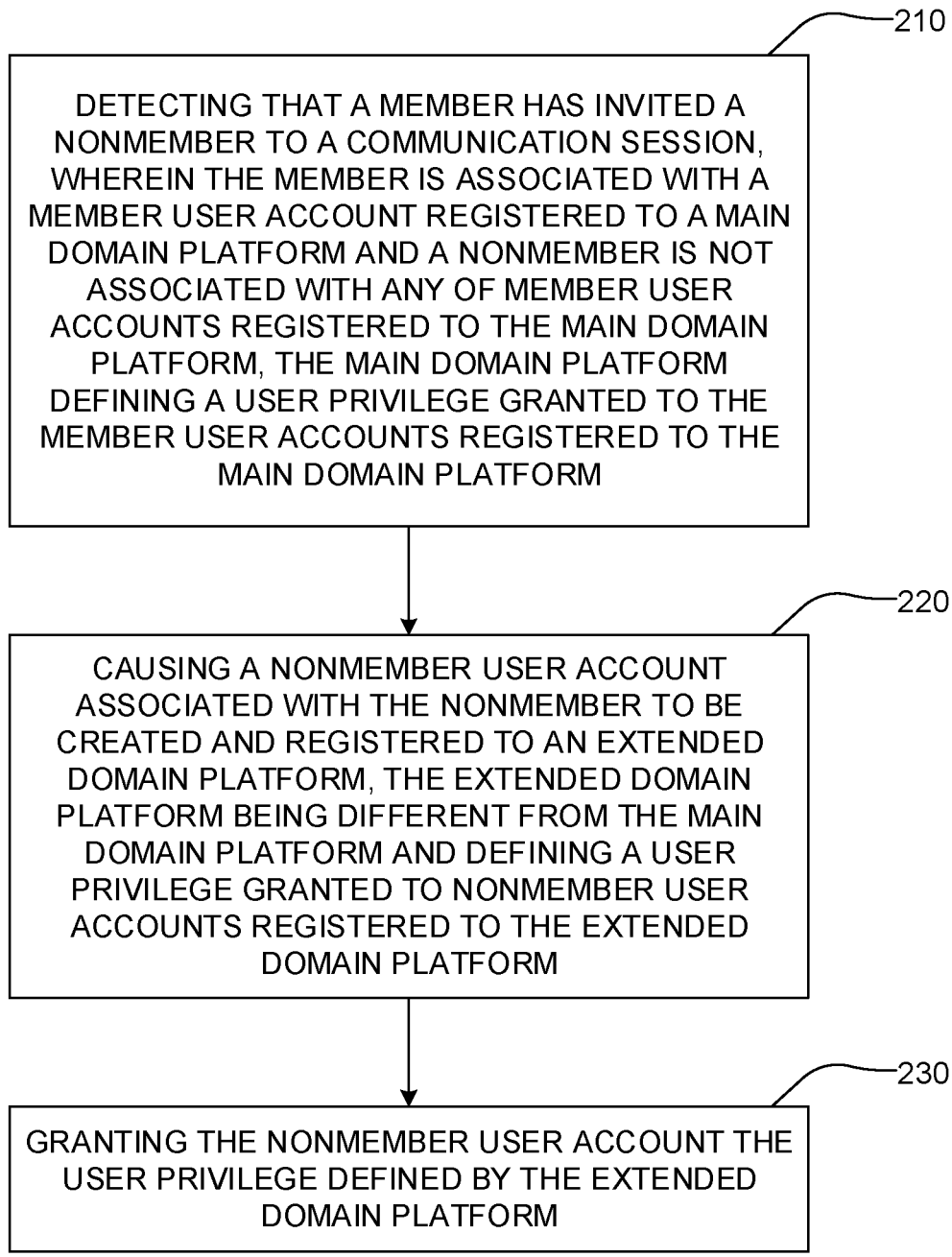
FIG. 2 is a flow diagram showing operations by a device of the system shown in FIG. 1 for the borderless communication and collaboration solution.

FIG. 2 is a flow diagram with operations by the device 100 for providing a communication solution between a member of an organization and a nonmember who is not a member of the organization.

At 210, the device 100 may detect that a member of the organization 20, for example, the member 150A, has invited a nonmember, for example, the nonmember 180A, to a communication session (e.g., a chatroom, voice conference, video conference, etc.). The member 150A may be associated with a member user account registered to the main domain platform 110. The nonmember 180A may not be associated with any of member user accounts registered to the main domain platform 110. The main domain platform 110 may define a user privilege granted to the member user accounts registered to the main domain platform 110.

For example, the device 100 may receive, from the member device 140A associated with the member 150A via the network 130, identification information (e.g., a phone number, email address, messenger alias, etc.) of the nonmember 180A. Such identification information may be received when the member 150A initiates a new communication session or adds the nonmember 180A to an existing communication session. The device 100 may control the main domain platform 110 to search the received identification information in the main domain platform 110 and determine whether the received identification information is associated with any of the existing member user account registered to the main domain platform 110. When no matching member user account is found from the search, the device 100 may determine that the member 150A has invited a nonmember to the communication session.

At 220, the device 100 may cause a nonmember user account associated with the nonmember 180A to be created and registered to the extended domain platform 120. The extended domain platform 120 may be different from the main domain platform 100. The extended domain platform 120 may define a user privilege granted to nonmember user accounts registered to the extended domain platform 120. The device 100 may then communicate, via the internet 160, with the nonmember device 170A to invite the nonmember 180A to the communication session.

The nonmember user account may be created automatically when the nonmember 180A is invited to the communication session. No sign-up or registration process may need to be performed or completed by the nonmember 180A. For example, both the member 150A and nonmember 180A may be using the same messaging application platform (e.g., a messaging mobile app) hosted by the device 100. The member 150A may select the name or phone number of the nonmember 180A on a contact list of the messaging mobile app to invite the nonmember 180A to a chat room. Upon receiving the selected name or phone number of the nonmember 180A from the member device 140A, the device 100 may automatically create a nonmember user account for the nonmember 180A. Alternatively, the nonmember user account may be created when the device 100 receives, from the member device 140A, a user input by the user 150A to create the nonmember user account associated with the nonmember 180A.

At step 230, the device 100 may grant the nonmember user account the user privileges defined by the extended domain platform 120. The user privileges granted to the nonmember user account may include a privilege to access a domain directory managed by the main domain platform 110 or extended domain platform 120, a privilege to start a new communication session, a privilege to invite, to a communication session, a user registered to the main domain platform 110 or extended domain platform 120, etc. As such, despite being not registered to the main domain platform 110, the nonmember 180A may be granted with the privileges to communicate with the member 180A.

By registering the nonmember user account to the extended domain platform 120, the main domain platform 110 may be separated from a responsibility of managing both the member and nonmember user accounts, making it easier to manage the member user accounts. For example, the main domain platform 110 may carry out a bulk data update for the member user accounts without accidentally updating the nonmember accounts. Also, a member or IT personnel may add, edit or delete a nonmember user account to or from the extended domain platform 120 without accidentally altering or deleting the member user account.

Upon being registered to the extended domain platform, the nonmember 180A may become an entity of the domain directory that the organization can recognize, track, monitor and manage within the organization's domain. Also, the members 150 may be able to search the nonmember 180A via the extended domain platform 120.

As such, the device 100 may automatically detect that the nonmember 180A is invited to the communication session and may automatically create and register a nonmember user account for the nonmember 180A to the extended domain platform 120. Hence, the member 150A who has invited the nonmember 180A may initiate the communication session as if the member 150A were initiating a communication with another member registered to the main domain platform 110. The member 150A may not need to take any additional actions to report the nonmember 180A or the communication session with the nonmember 180A to the organization 20. The nonmember 180A may join the communication session without going through any registration or verification steps. Hence, the member 150A may be able to communicate with the nonmember 180A immediately.

The device 100 may be further configured to track and monitor activities of the nonmember 180A to ensure that the nonmember 180A is complying with security and confidentiality rules enforced by the main and extended domain platforms 110 and 120. The device 100 may also track and monitor all the activities in the communication session. The device 100 may revoke the privileges granted to the nonmember 180A and remove the nonmember 180A from the communication session when a predetermined condition is met.

For example, the device 100 may receive, from the member device 140A, a request to revoke the user privileges granted to the nonmember 180A, which may include removing the nonmember 180A from the communication session. This may happen when the collaboration between the member 150A and nonmember 180A is completed and the nonmember 180A no longer needs to access the messages and information exchanged during the communication session. Alternatively, the device 100 may monitor activities in the communication session and revoke the privileges granted to the nonmember 180A when there has been no activity for a predetermined period (e.g., 24 hours, one week, etc.).

Upon revoking the user privileges, the nonmember 180A may be removed from the communication session and no longer be allowed to access the messages or information exchanged during the communication session. For example, the device 100 may delete data related to the communication session from the nonmember device 170A. This may ensure that the message and information shared during the communication session are not mishandled by the nonmember 180A. In addition to removing the nonmember from the communication session with the member 150A, the device 100 may be configured to identify all the member-related communication sessions in which the nonmember 180A is participating, remove the nonmember 180A from all of the identified communication sessions, and remove data related to the identified communication sessions from the nonmember device 170A. This may happen when the device 100 determines that the nonmember 180A causes a security threat or has not been active for a predetermined time period.

As such, the device 100 may allow the organization 20 to manage communication sessions involving nonmembers in a prompt and efficient manner.

Figure 3A:
FIGS. 3A to 8C illustrate implementations in which a communication session is initiated and a nonmember is invited to the communication session, using the borderless communication and collaboration solution.

FIGS. 3A to 8C illustrate implementations of how a communication session is initiated and a nonmember is invited to the communication session. FIGS. 3A, 3B and 3C illustrate an implementation of a graphical user interface (GUI) of a message application on a nonmember device (e.g., nonmember device 170A) associated with a nonmember, Peter (e.g., nonmember 180A), a member device (e.g., member device 140A) associated with a member, Will (e.g., member 150A) and another member device (e.g., member device 140B) associated with another member, Wasif (e.g., member 150B), respectively. The messaging application may operate in communication with the device 100.

Figure 3B:
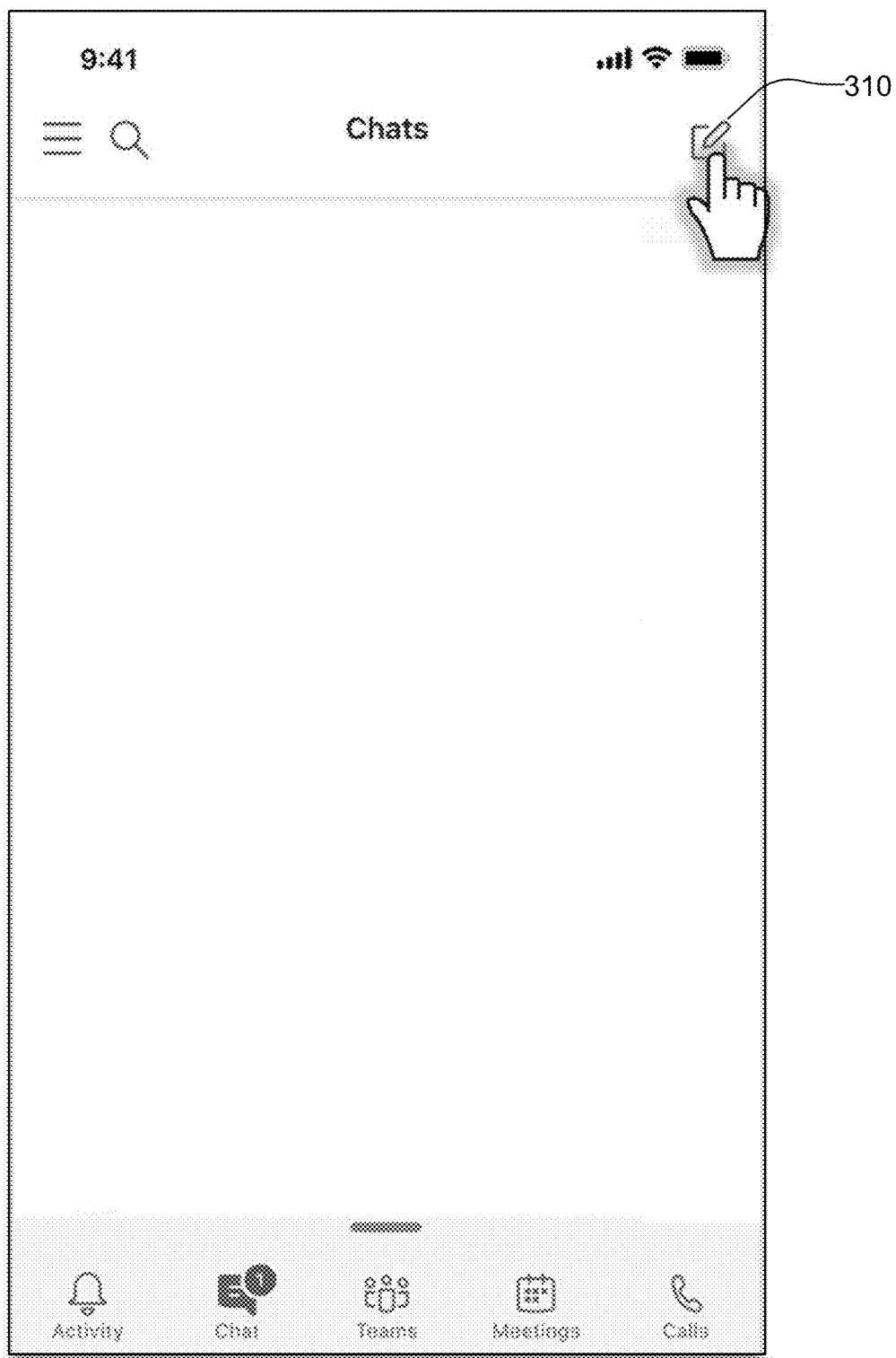
Figure 3C:

Referring to FIGS. 3A, 3B and 3C, Will may interact with the GUI of the messaging application running on his phone (e.g., member device 140A) to indicate that he would like to start a new communication session (e.g., a new chat session) with Peter (e.g., nonmember 180A) and Wasif (e.g., member 140B). For example, Will may touch a new chat icon 310 displayed on the top right corner of the GUI. At this time, the device 100 may not know whom Will wants to invite to the chat session, and hence Peter's phone (e.g., nonmember device 170A) and Wasif's phone (e.g., member device 140B) may not display any information related to the chat session, which is shown as blank in FIGS. 3A and 3C.

Figure 4A:
Figure 4B:
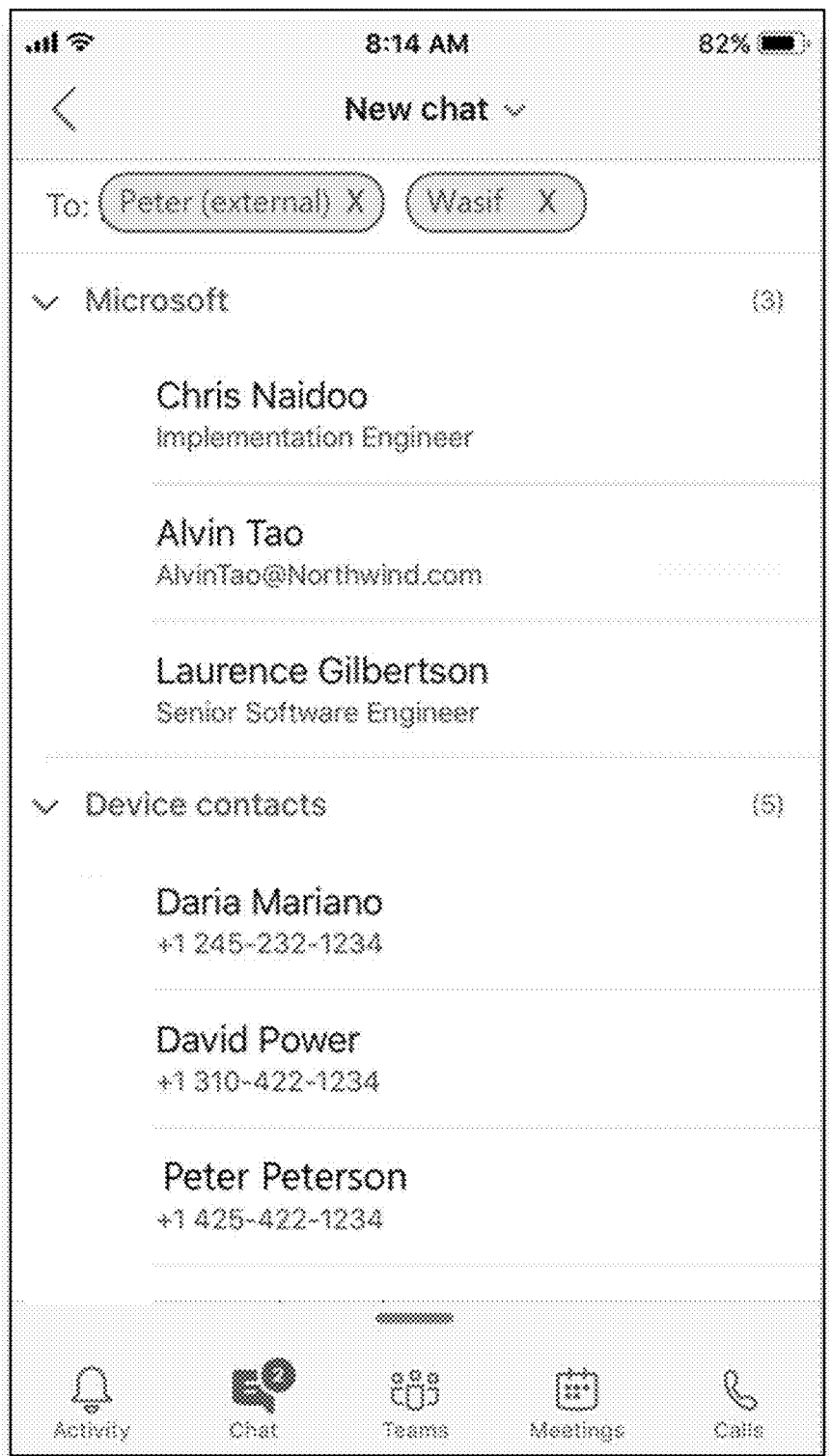
Figure 4C:
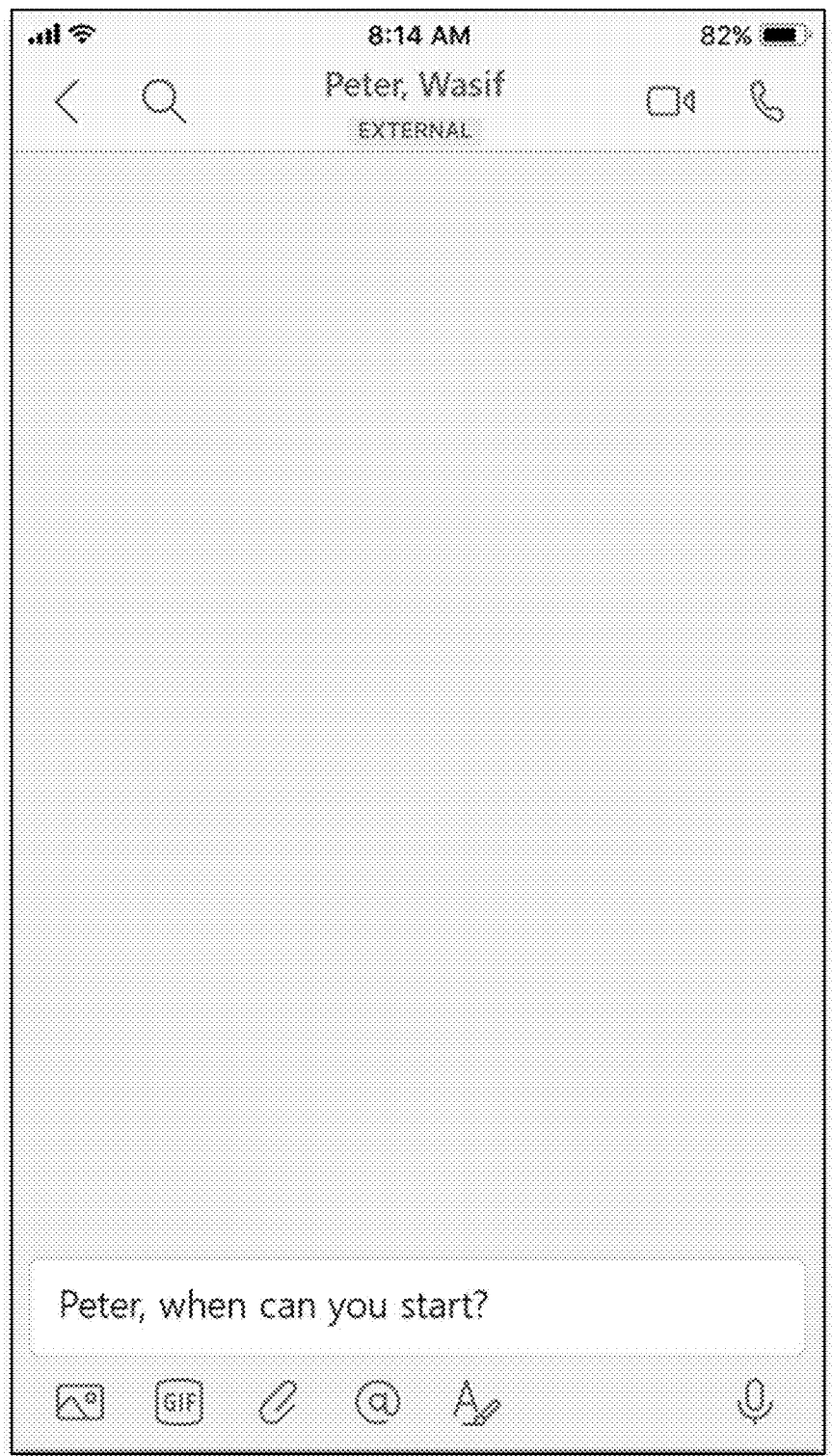

Referring to FIGS. 4A, 4B and 4C, upon receiving Will's input to initiate a new chat session, Will's device may display a GUI for selecting a member or nonmember to be invited to the chat session. Since the messaging application operates in connection with the device 100 and main domain platform 110, Will's device may be able to display other members, such as Christ Naidoo, Alvin Tao and Laurence Gilbertson as shown in FIG. 4B. Will's device may also be able to display nonmembers, such as Daria Mariano, David Power and Peter Peterson, whose contact information (e.g., a name, phone number, email address, messenger alias, etc.) is stored locally in the phone or in a cloud space. Will may then select a member or nonmember that he would like to invite to the chat session. FIG. 4B shows that Will have selected Peter, who is a nonmember, and Wasif, who is a member. Will's device may then notify to the device 100 that Peter and Wasif are to be invited to the chat session. Upon receiving information about Peter and Wasif, the device 100 may determine that Peter is not a member of the organization 20 and then create and register an account for Peter to the extended domain platform 120. The device 100 may then provide predetermined privileges to Peter's account such that Peter may interact with Will and Wasif once Peter enters the chat session. As such, Peter is automatically registered to the extended domain platform 120 when Will selects Peter as an invitee to the chat session. No other actions are needed to be taken by Will or Peter.

Figure 5A:
Figure 5B:
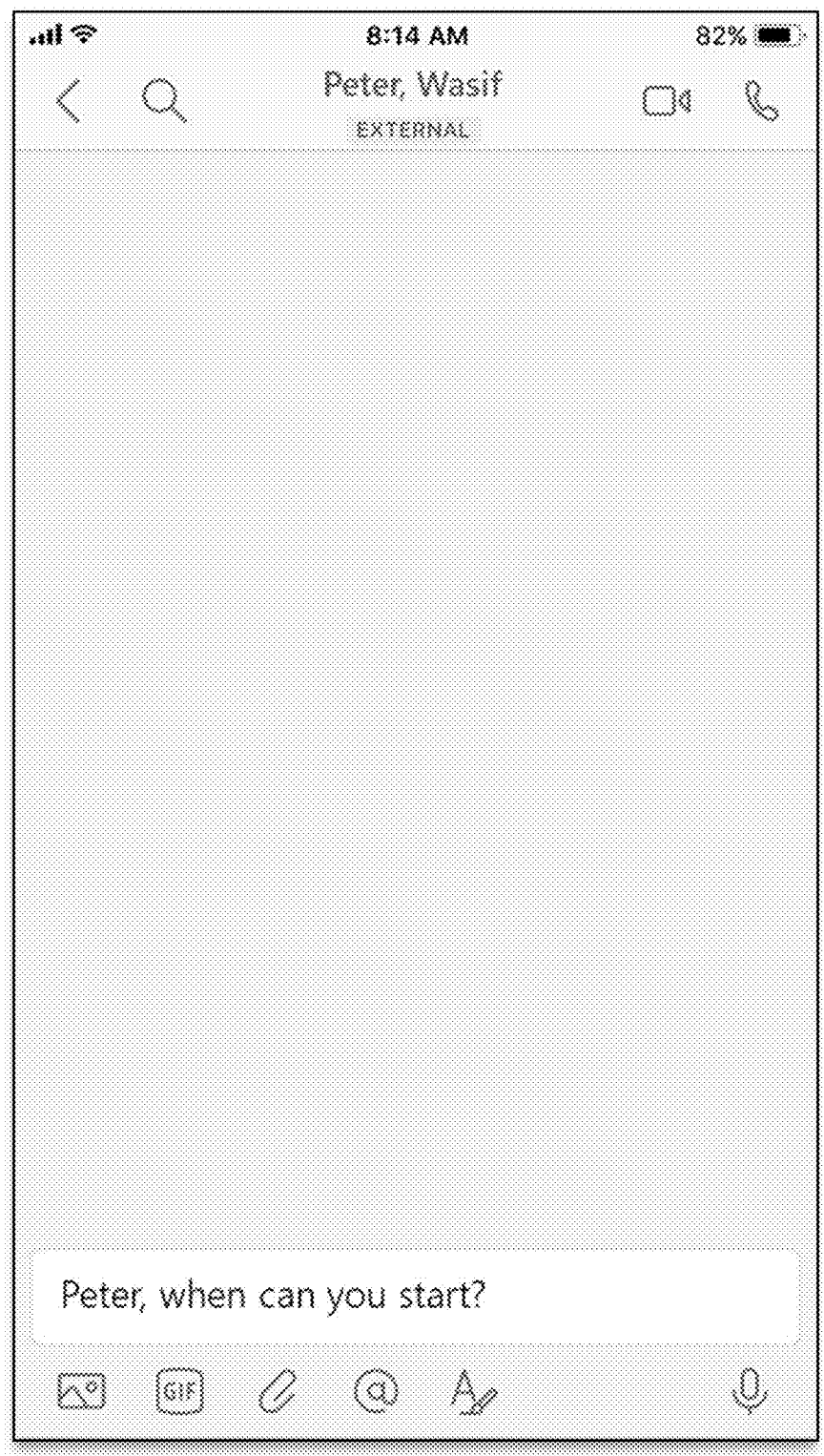
Figure 5C:

Referring to FIGS. 5A, 5B and 5C, once Peter's account is created and registered to the extended domain platform 120, the messaging application running on Will's device may display a GUI for the chat session, in which Will can type and post a message to Peter and Wasif. Peter and Wasif's devices may not display any information related to the chat session until Will sends a message. FIG. 5B shows a message "Peter, when can you start?" typed by Will.

Figure 6A:
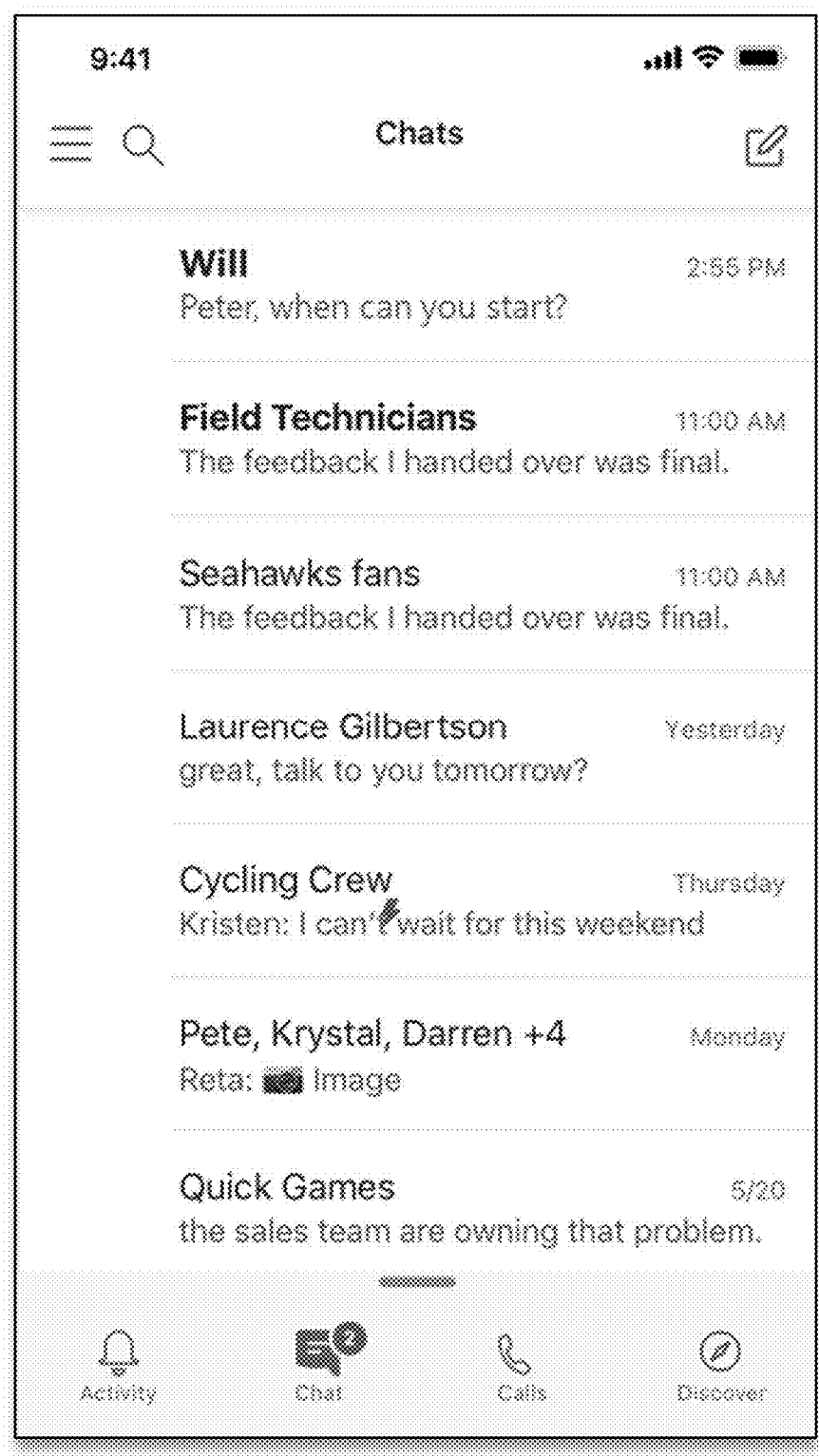
Figure 6B:
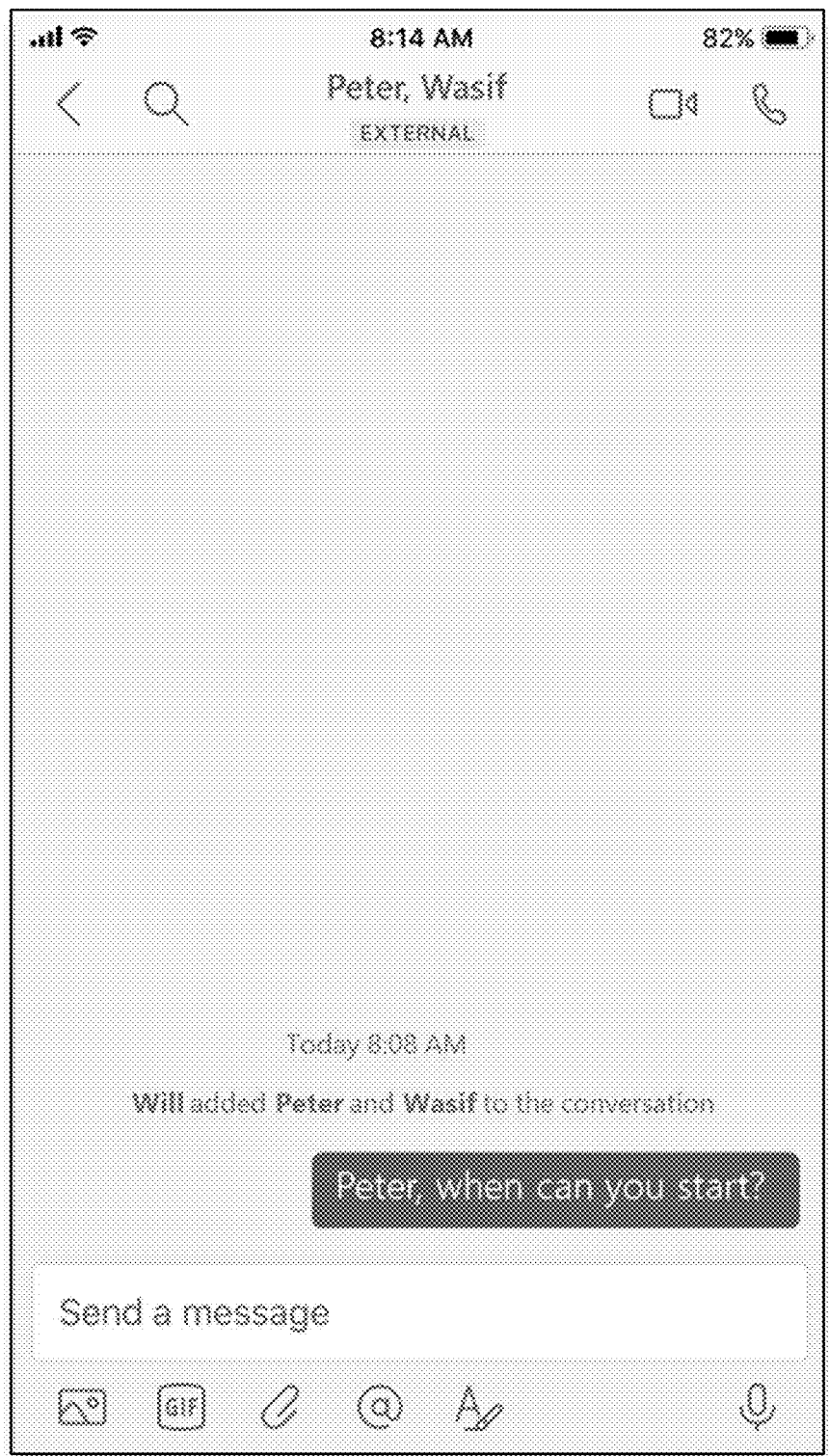
Figure 6C:
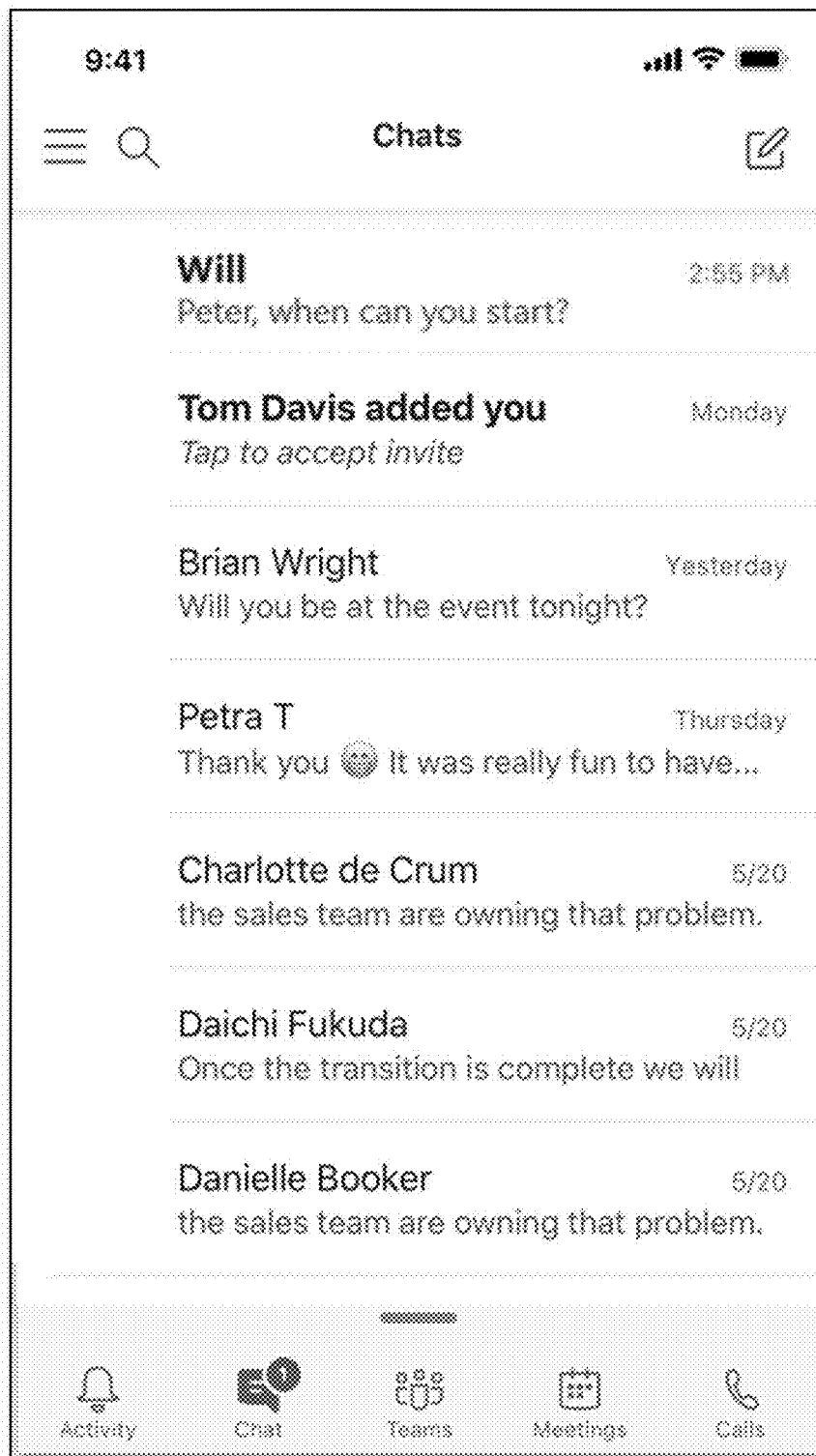

Referring to FIGS. 6A, 6B and 6C, the message sent from Will's device may be sent to the device 100 and then relayed to Peter and Wasif devices. The message may then be displayed on the GUI of the messaging application running on Peter and Wasif devices. For example, as shown in FIGS. 6A and 6C, Will's message may be listed on the chat list on Peter and Wasif's devices.

Figure 7A:
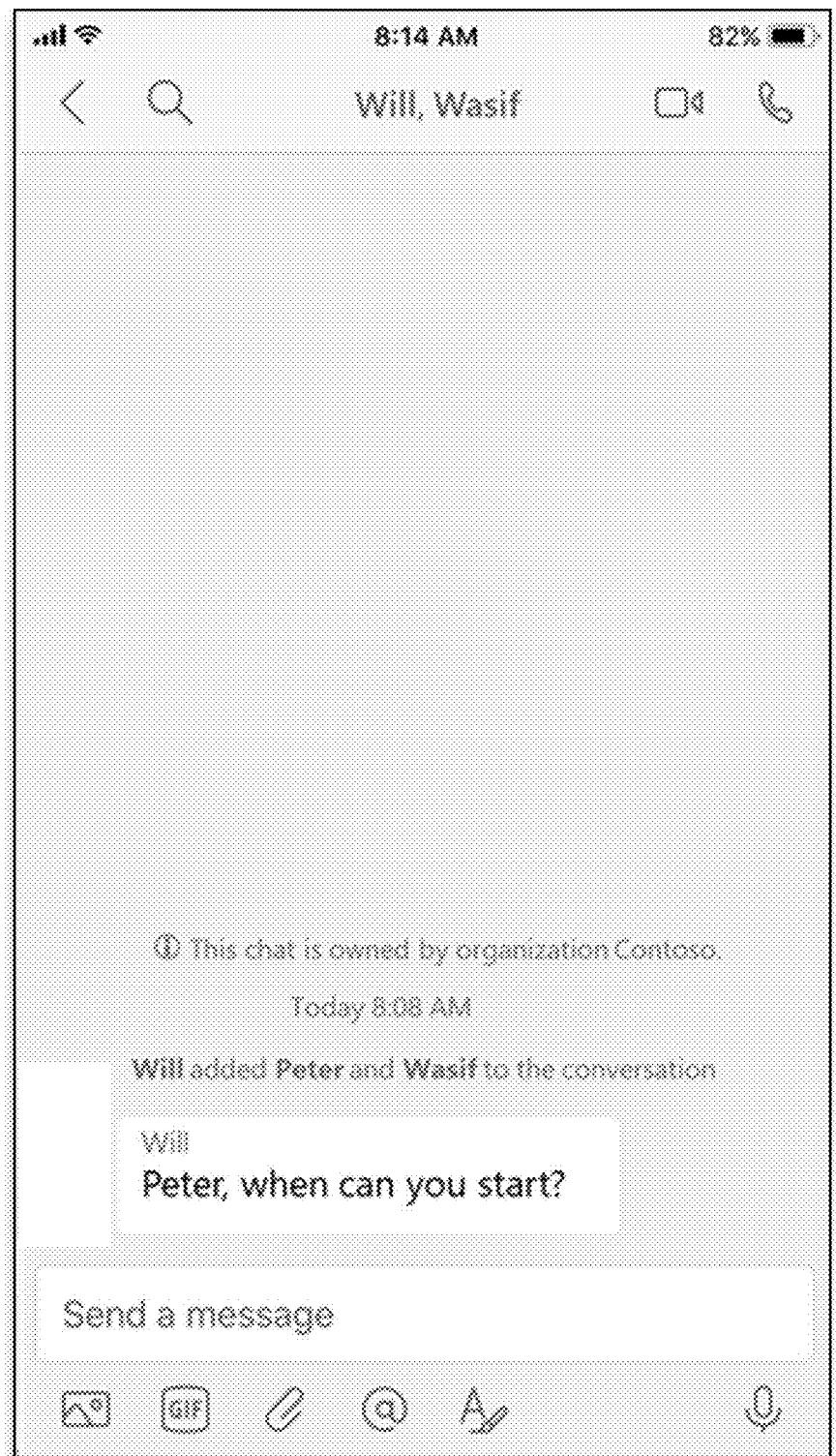
Figure 7B:
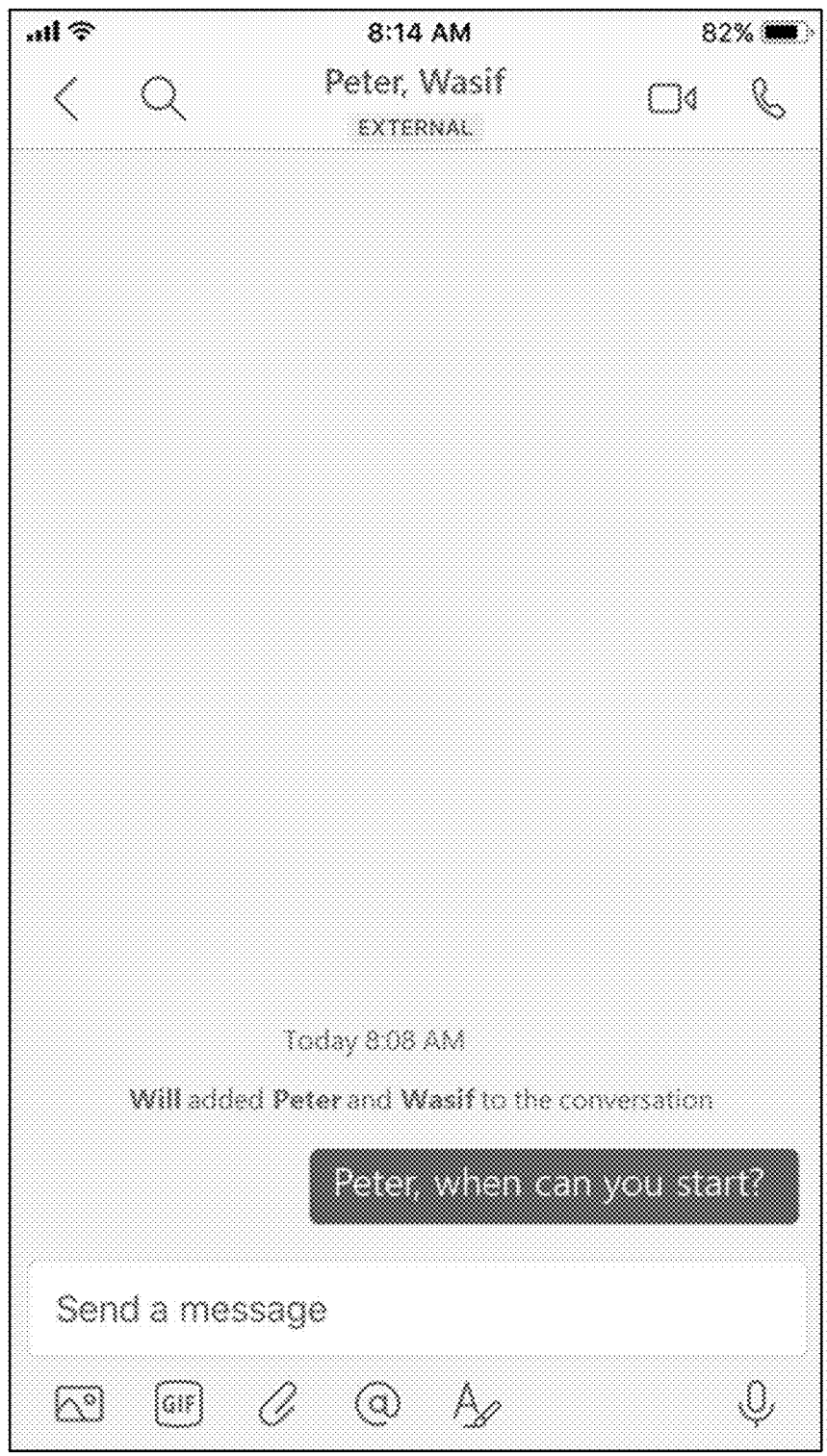
Figure 7C:
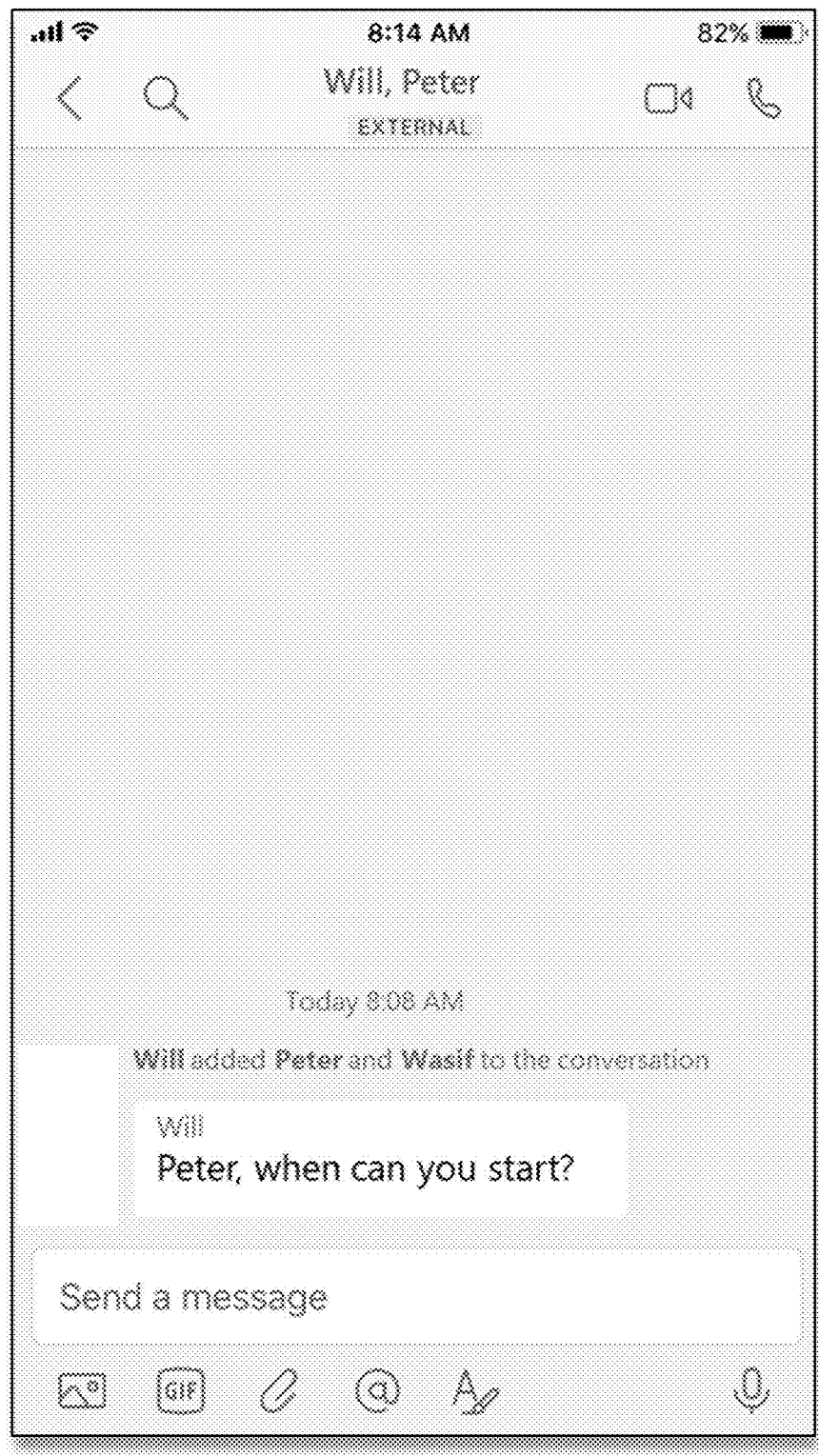

Referring to FIGS. 7A, 7B and 7C, when Peter and Wasif select Will's message from the message list, Peter and Wasif devices may display the chat session screen where Will's message is displayed, as shown in FIGS. 7A and 7C. Peter's chat session screen may indicate that the chat session is owned by the organization 20 and Will has added Peter and Wasif to the chat session. As such, despite being a nonmember, Peter may join the chat session without needing to take any extra steps to register himself to a directory service of the organization 20 or sign up for a new messaging service.

Figure 8A:
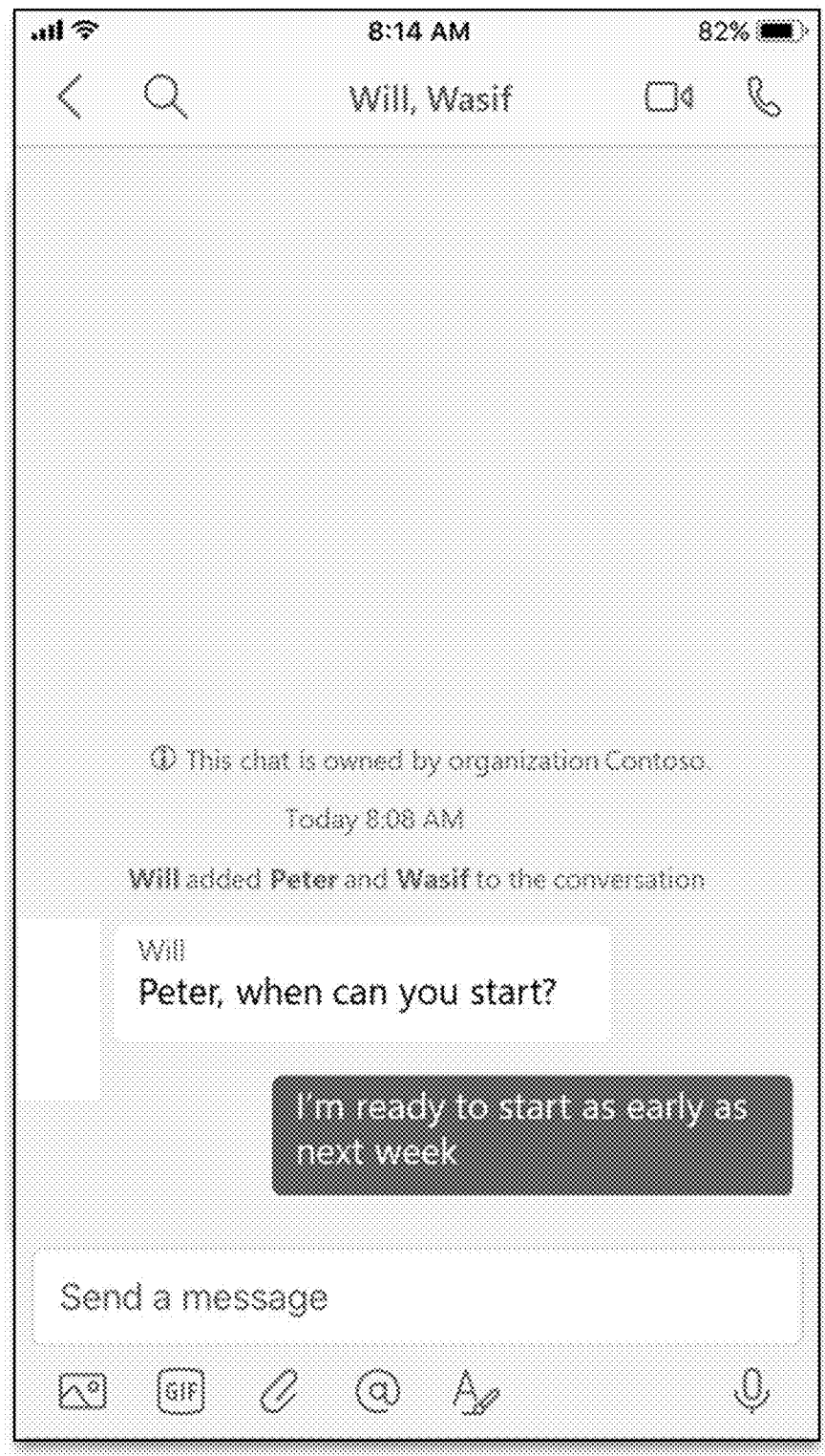
Figure 8B:
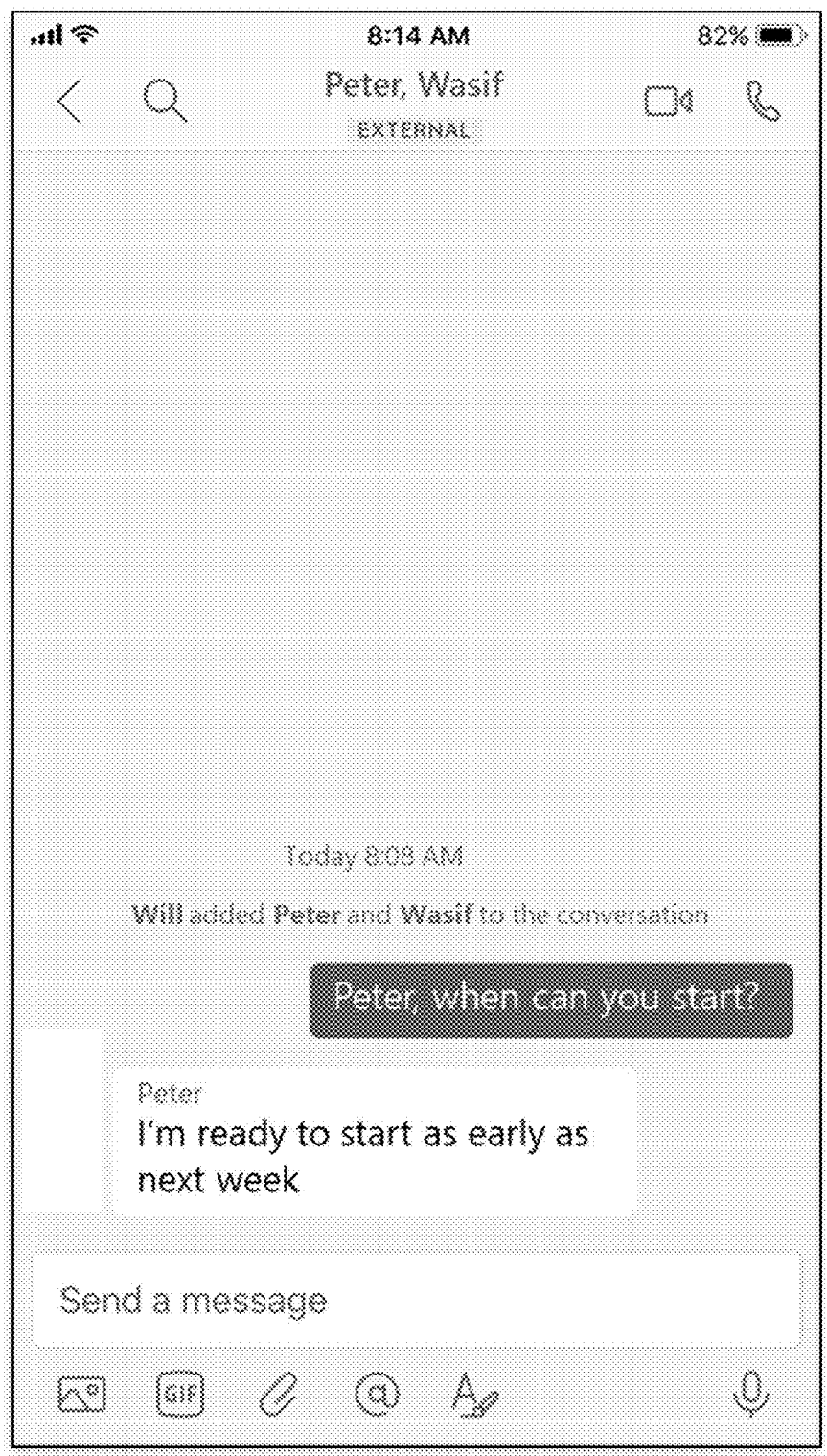
Figure 8C:
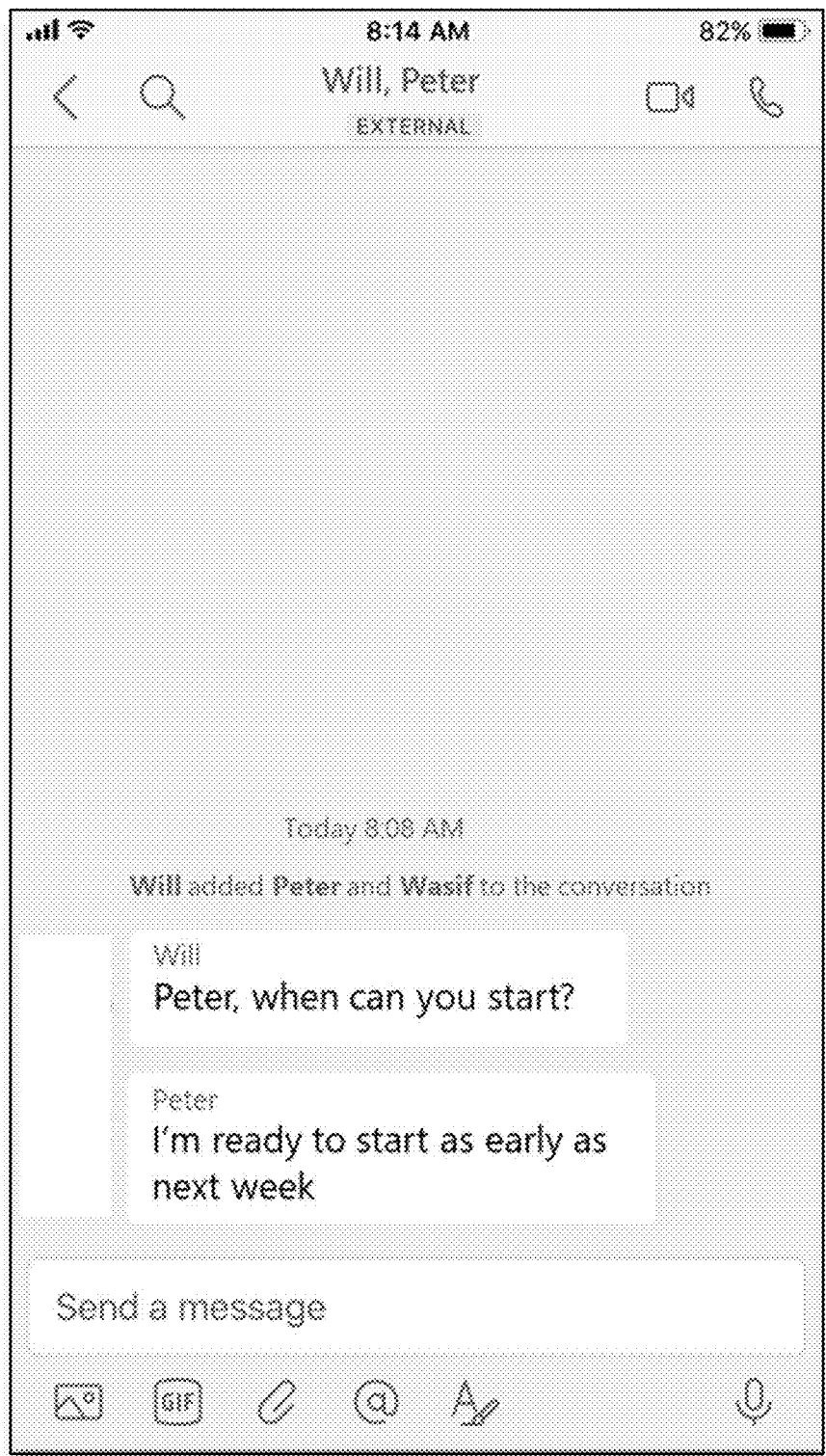

Referring to FIGS. 8A, 8B and 8C, upon Peter's account being created and registered to the extended domain platform 120, the device 100 may provide predetermined privileges, including a privilege to read the message posted by others and post a message to other. For example, as shown in FIG. 8A, in response to Will's message, Peter may post a response "I'm ready to start as early as next week." Peter's response may be sent to the device 100 and then relayed to Will and Wasif's devices, which may display Peter's response on the chat session GUI, as shown in FIGS. 8B and 8C. As such, the device 100 may provide a borderless communication and collaboration solution between members of an organization and nonmembers, that is easy to join and use for the members and nonmembers and easy to track, monitor and manage for the organization.

The device 100 may be configured to work with two or more organizations that do not share the same member and extended director domain platforms. When a nonmember is invited to two chat sessions by two different members of two different organizations, the device 100 may create two different nonmember user accounts for the nonmember and register the two different accounts to two different extended domain platforms, respectively, each extended domain platform being operated by a different organization. Each account may be managed according to different rules set by the different organizations. Hence, a nonmember may participate as many communication sessions as needed as long as the organizations offer the borderless communication and collaboration solution.

FIG. 9 is a block diagram showing an example a computer system 900 upon which aspects of this disclosure may be implemented. The computer system 900 may include a bus 902 or other communication mechanism for communicating information, and a processor 904 coupled with the bus 902 for processing information. The computer system 900 may also include a main memory 906, such as a random-access memory (RAM) or other dynamic storage device, coupled to the bus 902 for storing information and instructions to be executed by the processor 904. The main memory 906 may also be used for storing temporary variables or other intermediate information during execution of instructions to be executed by the processor 904. The computer system 900 may implement, for example, the device 100, member devices 140 and nonmember devices 170.

The computer system 900 may further include a read only memory (ROM) 908 or other static storage device coupled to the bus 902 for storing static information and instructions for the processor 904. A storage device 910, such as a flash or other non-volatile memory may be coupled to the bus 902 for storing information and instructions.

The computer system 900 may be coupled via the bus 902 to a display 912, such as a liquid crystal display (LCD), for displaying information. One or more user input devices, such as the example user input device 914 may be coupled to the bus 902, and may be configured for receiving various user inputs, such as user command selections and communicating these to the processor 904, or to the main memory 906. The user input device 914 may include physical structure, or virtual implementation, or both, providing user input modes or options, for controlling, for example, a cursor, visible to a user through display 912 or through other techniques, and such modes or operations may include, for example virtual mouse, trackball, or cursor direction keys.

The computer system 900 may include respective resources of the processor 904 executing, in an overlapping or interleaved manner, respective program instructions. Instructions may be read into the main memory 906 from another machine-readable medium, such as the storage device 910. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media may include, for example, optical or magnetic disks, such as storage device 910. Transmission media may include optical paths, or electrical or acoustic signal propagation paths, and may include acoustic or light waves, such as those generated during radio-wave and infra-red data communications, that are capable of carrying instructions detectable by a physical mechanism for input to a machine.

The computer system 900 may also include a communication interface 918 coupled to the bus 902, for two-way data communication coupling to a network link 920 connected to a local network 922. The network link 920 may provide data communication through one or more networks to other data devices. For example, the network link 920 may provide a connection through the local network 922 to a host computer 924 or to data equipment operated by an Internet Service Provider (ISP) 926 to access through the Internet 928 a server 930, for example, to obtain code for an application program.

In the following, further features, characteristics and advantages of the invention will be described by means of items:

Item 1. A device comprising a processor and a memory in communication with the processor, the memory comprising executable instructions that, when executed by the processor, cause the processor to control the device to perform functions of detecting that a first user has invited a second user to a communication session, wherein the first user is associated with a first user account registered to a first domain platform and the second user is not associated with any of user accounts registered to the first domain platform, the first domain platform defining a first user privilege granted to the user accounts registered to the first domain platform; based on the detection that the first user has invited the second user to the communication session, causing a second user account associated with the second user to be created and registered to a second domain platform, the second domain platform being different from the first domain platform and defining a second user privilege granted to user accounts registered to the second domain platform; and granting the second user account the second user privilege.

Item 2. The device of Item 1, wherein, for causing the second user account to be created and registered to the second domain platform, the instructions, when executed by the processor, further cause the processor to control the device to perform a function of controlling the second domain platform to automatically create and register the second user account in response to detecting that the first user has invited the second user to the communication session.

Item 3. The device of Item 1, wherein, for causing the second user account to be created and registered to the second domain platform, when executed by the processor, further cause the processor to control the device to perform functions of receiving, from a first user device associated with the first user, a user input to create the second user account to the second domain platform; and in response to the user input received from the first device, controlling the second domain platform to create and register the second user account.

Item 4. The device of Item 1, wherein the first user privilege comprises at least one of a privilege to invite, to a communication session, a user that is not associated with any of the user accounts registered to the first or second domain platform; a privilege to add the second user to a domain directory managed by the first or second domain platform such that the second user is searchable on the domain directory; a privilege to revoke the second user privilege granted to the second user account; and a privilege to remove the second user account from the second domain platform.

Item 5. The device of Item 1, wherein the second user privilege comprises at least one of a privilege to access a domain directory managed by the first or second domain directory; a privilege to start a new communication session; and a privilege to invite, to a communication session, a user registered to the first or second domain platform.

Item 6. The device of Item 1, wherein the users registered to the first domain platform and the users registered to the second domain platform are mutually exclusive.

Item 7. The device of Item 1, wherein, for detecting that the first user has invited the second user to the communication session, the instructions, when executed by the processor, further cause the processor to control the device to perform a function of receiving, from a first user device associated with the first user via a communication network, identification information of the second user.

Item 8. The device of Item 7, wherein the identification information comprises a phone number, email address or messenger alias of the second user.

Item 9. The device of Item 1, wherein the instructions, when executed by the processor, further cause the processor to control the device to perform functions of detecting a predetermined condition is met with respect to the second user; and revoking the second user privilege granted to the second user.

Item 10. The device of Item 9, wherein, for detecting that the predetermined condition is met, the instructions, when executed by the processor, further cause the processor to control the device to perform a function of receiving, from a first user device associated with the first user, a request to revoke the second user privilege granted to the second user; or detecting that there has been no activity in the communication session for a predetermined time period.

Item 11. A method of operating a device for providing a communication solution between a user registered to a domain platform and another user not registered to the same domain platform, comprising detecting that a first user has invited a second user to a communication session, wherein the first user is associated with a first user account registered to a first domain platform and the second user is not associated with any of user accounts registered to the first domain platform, the first domain platform defining a first user privilege granted to the user accounts registered to the first domain platform; based on the detection that the first user has invited the second user to the communication session, causing a second user account associated with the second user to be created and registered to a second domain platform, the second domain platform being different from the first domain platform and defining a second user privilege granted to user accounts registered to the second domain platform; and granting the second user account the second user privilege.

Item 12. The method of Item 11, wherein causing the second user account to be created and registered to the second domain platform comprising controlling the second domain platform to automatically create and register the second user account in response to detecting that the first user has invited the second user to the communication session.

Item 13. The method of Item 12, wherein causing the second user account to be created and registered to the second domain platform comprising receiving, from a first user device associated with the first user, a user input to create the second user account to the second domain platform; and in response to the user input received from the first device, controlling the second domain platform to create and register the second user account.

Item 14. The method of Item 11, wherein the first user privilege comprises at least one of a privilege to invite, to a communication session, a user that is not associated with any of the user accounts registered to the first or second domain platform; a privilege to add the second user to a domain directory managed by the first or second domain platform such that the second user is searchable on the domain directory; a privilege to revoke the second user privilege granted to the second user account; and a privilege to remove the second user account from the second domain platform.

Item 15. The method of Item 14, wherein the second user privilege comprises at least one of a privilege to access a domain directory managed by the first or second domain directory; a privilege to start a new communication session; and a privilege to invite, to a communication session, a user registered to the first or second domain platform.

Item 16. The method of Item 11, wherein the users registered to the first domain platform and the users registered to the second domain platform are mutually exclusive.

Item 17. The method of Item 11, wherein detecting that the first user has invited the second user to the communication session comprises receiving, from a first user device associated with the first user via a communication network, identification information of the second user.

Item 18. The device of Item 17, wherein the identification information comprises a phone number, email address or messenger alias of the second user.

Item 19. The method of Item 11, further comprising detecting that a predetermined condition is met with respect to the nonmember; and removing the nonmember from the communication session.

Item 20. A non-transitory computer readable medium containing instructions which, when executed by a processor, cause a computer to perform functions of detecting that a first user has invited a second user to a communication session, wherein the first user is associated with a first user account registered to a first domain platform and the second user is not associated with any of user accounts registered to the first domain platform, the first domain platform defining a first user privilege granted to the user accounts registered to the first domain platform; based on the detection that the first user has invited the second user to the communication session, causing a second user account associated with the second user to be created and registered to a second domain platform, the second domain platform being different from the first domain platform and defining a second user privilege granted to user accounts registered to the second domain platform; and granting the second user account the second user privilege.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system for managing multiple domain platforms including first and second domain platforms operating independently from each other, the first domain platform configured to grant a first privilege to a first user access privilege to initiate, using a communication tool provided by the first domain platform, a communication activity, the system comprising:
    a processor; and
    a computer-readable medium in communication with the processor and storing instructions that, when executed by the processor, cause the processor alone or in combination with other processors to control the system to perform:
        detecting that a first user has initiated, using the communication tool, the communication activity involving a second user, wherein the first user is associated with a first user account registered to the first domain platform;
        determining whether the second user is associated with any of user accounts registered to the first or second domain platform;
        in response to detecting that the second user is not associated with any of the user accounts registered to the first or second domain platform, creating a second user account associated with the second user and register the second user account to the second domain platform; and
        granting a second user access privilege to the second user account registered to the second domain platform, the second user access privilege including a privilege to respond to the communication activity initiated by the first user,
wherein the first user access privilege granted by the first domain platform includes one or more access privileges that are not included in the second user access privilege granted by the second domain platform.

2. The system of claim 1, wherein the communication activity involving the second user includes at least one of:
messaging or calling the second user;
inviting, to a group chat or conference, the second user;
emailing to the second user;
saving contact information of the second user; and
scheduling a meeting involving the second user.

3. The system of claim 1, wherein the first user access privilege includes a least one of:
a first access privilege to invite, to a communication session, a user that is not associated with any of the user accounts registered to the first or second domain platform;
a second access privilege to add the second user to a domain directory managed by the first or second domain platform such that the second user is searchable on the domain directory;
a third access privilege to revoke the second user access privilege granted to the second user account associated with the second user; and
a fourth access privilege to remove, from the second domain platform, the second user account associated with the second user.

4. The system of claim 3, wherein the second user access privilege granted to the second user account excludes the first, second, third and fourth access privileges.

5. The system of claim 1, wherein the second user access privilege comprises at least one of:
a first access privilege to respond to the communication activity initiated by the first user;
a second access privilege to access a domain directory managed by the first or second domain platform;
a third access privilege to start a new communication session; and
a fourth access privilege to invite, to an existing communication session, a third user registered to the first or second domain platform.

6. The system of claim 1, wherein, for detecting that the first user has initiated the communication activity involving the second user, the instructions, when executed by the processor, further cause the processor alone or in combination with other processors to control the system to perform detecting that the first user has provided identification information of the second user, the identification information including at least one of a phone number, email address and messenger alias of the second user.

7. The system of claim 6, wherein, for determining whether the second user is associated with any of the user accounts registered to the first or second domain platform, the instructions, when executed by the processor, further cause the processor alone or in combination with other processors to control the system to perform determining whether the identification information of the second user corresponds to user information of any of the user accounts registered to the first or second domain platform.

8. The system of claim 1, wherein the instructions, when executed by the processor, further cause the processor alone or in combination with other processors to control the system to perform prohibiting granting the first user access privilege to a user account not registered to the first domain platform.

9. The system of claim 1, wherein the instructions, when executed by the processor, further cause the processor alone or in combination with other processors to control the system to perform prohibiting granting the second user access privilege to the second user unless the second user account associated with the second user is created and registered to the second domain platform.

10. The system of claim 1, wherein the instructions, when executed by the processor, further cause the processor alone or in combination with other processors to control the system to perform revoking the second user access privilege granted to the second user when a predetermined condition is met with respect to the second user.

11. A method of managing multiple domain platforms including first and second domain platforms operating independently from each other, the first domain platform configured to grant a first privilege to a first user access privilege to initiate, using a communication tool provided by the first domain platform, a communication activity, the method comprising:
detecting that a first user has initiated, using the communication tool, the communication activity involving a second user, wherein the first user is associated with a first user account registered to the first domain platform;
determining whether the second user is associated with any of user accounts registered to the first or second domain platform;
in response to detecting that the second user is not associated with any of the user accounts registered to the first or second domain platform, creating a second user account associated with the second user and register the second user account to the second domain platform; and
granting a second user access privilege to the second user account registered to the second domain platform, the second user access privilege including a privilege to respond to the communication activity initiated by the first user,
wherein the first user access privilege granted by the first domain platform includes one or more access privileges that are not included in the second user access privilege granted by the second domain platform.

12. The method of claim 11, wherein the communication activity involving the second user includes at least one of:
messaging or calling the second user;
inviting, to a group chat or conference, the second user;
emailing to the second user;
saving contact information of the second user; and
scheduling a meeting involving the second user.

13. The method of claim 11, wherein the first user access privilege includes a least one of:
a first access privilege to invite, to a communication session, a user that is not associated with any of the user accounts registered to the first or second domain platform;
a second access privilege to add the second user to a domain directory managed by the first or second domain platform such that the second user is searchable on the domain directory;
a third access privilege to revoke the second user access privilege granted to the second user account associated with the second user; and a fourth access privilege to remove, from the second domain platform, the second user account associated with the second user.

14. The method of claim 13, wherein the second user access privilege granted to the second user account excludes the first, second, third and fourth access privileges.

15. The method of claim 11, wherein the second user access privilege comprises at least one of:
- a first access privilege to respond to the communication activity initiated by the first user;
- a second access privilege to access a domain directory managed by the first or second domain platform;
- a third access privilege to start a new communication session; and
- a fourth access privilege to invite, to an existing communication session, a third user registered to the first or second domain platform.

16. The method of claim 11, wherein detecting that the first user has initiated the communication activity involving the second user includes detecting that the first user has provided identification information of the second user, the identification information including at least one of a phone number, email address and messenger alias of the second user.

17. The method of claim 16, wherein determining whether the second user is associated with any of the user accounts registered to the first or second domain platform includes determining whether the identification information of the second user corresponds to user information of any of the user accounts registered to the first or second domain platform.

18. The method of claim 11, further comprising prohibiting granting the first user access privilege to a user account not registered to the first domain platform.

19. The method of claim 11, further comprising revoking the second user access privilege granted to the second user when a predetermined condition is met with respect to the second user.

20. A non-transitory computer-readable medium comprising instructions that, when executed by a processor, cause the processor alone or in combination with other processors to control a system to perform functions for managing multiple domain platforms including first and second domain platforms operating independently from each other, the first domain platform configured to grant a first privilege to a first user access privilege to initiate, using a communication tool provided by the first domain platform, a communication activity, the functions including:

- detecting that a first user has initiated, using the communication tool, the communication activity involving a second user, wherein the first user is associated with a first user account registered to the first domain platform;

- determining whether the second user is associated with any of user accounts registered to the first or second domain platform;

- in response to detecting that the second user is not associated with any of the user accounts registered to the first or second domain platform, creating a second user account associated with the second user and register the second user account to the second domain platform; and

- granting a second user access privilege to the second user account registered to the second domain platform, the second user access privilege including a privilege to respond to the communication activity initiated by the first user,

- wherein the first user access privilege granted by the first domain platform includes one or more access privileges that are not included in the second user access privilege granted by the second domain platform.

* * * * *